Patented Dec. 22, 1953

2,663,716

UNITED STATES PATENT OFFICE 2,663,716

SYNTHESIS OF ESTRONE

William S. Johnson, Madison, Wis., and Robert George Christiansen, Rensselaer, N. Y., assignors to Wisconsin Alumni Research Foundation, Madison, Wis., a corporation of Wisconsin No Drawing. Application July 28, 1952, Serial No. 301,370

15 Claims. (Cl. 260—343.3)

The total synthesis of estrone has been the goal of many investigators from as early as 1935; K. Miescher, Experientia, 5, 1 (1949). The problem is rendered particularly difficult by the fact that estrone is only one of sixteen possible stereoisomers. In 1948, Anner and Miescher announced the first successful synthesis of estrone; Experientia 4, 25 (1948). In 1950, Johnson, Banerjee, Schneider and Gutsche announced another synthesis by an entirely different approach; J. Am. Chem. Soc. 72, 1426 (1950). The practicability of both of these syntheses is limited by the non-stereo-specificity of the reactions leading to the "natural" isomer. Anner and Miescher's synthesis in addition involved over twenty steps, further contributing to a low over-all yield.

We have discovered a relatively short total synthesis of estrone. The process for the most part is stereo-specific and proceeds so as to give the correct stereoisomer as the only crystallizable product in good yield. The starting material in the synthesis is anisole or other lower alkyl phenyl ether. As the alkyl group merely protects the potential hydroxyl group and is removed to provide estrone with the desired OH group on ring A, it will be obvious to those skilled in the art that the methyl group used for illustrative purposes below may be replaced by other protecting groups which serve an equivalent purpose, and specifically will be governed by the particular substituted phenyl compound employed as the starting material.

For purposes of the present invention the synthesis will be described starting with the triester VII. This product is the trimethyl ester of 5-p-anisyl-6,7-dicarboxyheptanoic acid. The triacid is described by Johnson et al. in J. Am. Chem. Soc. 72, 2395 (1950). The general scheme of the synthesis is shown in the formulas given below.

Methyl 6-p-anisyl-3-carbomethoxy-2-keto-3-methyl-cyclohexane-1-acetate, IX.—A. Without isolation of compound VIII, i. e. methyl 6-p-anisyl - 3 - carbomethoxy - 2-keto-cyclohexane-1-acetate.—In a 1-1, flame-dried, 3-necked flask fitted with a rubber-sealed Hershberg wire stirrer, a 250-cc. dropping funnel with pressure equalizer, and a reflux condenser (all apparatus ground glass), was placed 400 cc. of sodium-dried, thiophene-free benzene. After the system had been evacuated (to insure complete removal of the air in the benzene) and filled with nitrogen three times, 11.62 g. (0.485 mole) of sodium hydride was added and the system was brought to equilibrium with a constant-pressure eudiometer while the benzene solution was refluxing. Then a solution of 79.8 g. (0.218 mole) of compound VII in 100 cc. of sodium-dried, thiophene-free benzene and 2 cc. (0.049 mole) of anhydrous methanol with stirring and refluxing, was added dropwise to the stirred refluxing solution over a period of one hour; under these conditions the reaction usually started within one hour (sometimes immediately). The progress of the reaction was followed by measuring the volume of evolved gas. After three hours 10 l. (about 90% of calculated) of gas was evolved and the rate of evolution was very slow. After the reaction-mixture had been cooled in an ice bath (still in an oxygen-free atmosphere) and 5 cc. of methanol had been added to destroy any excess sodium hydride, 85 cc. of methyl iodide was added and the mixture was stirred for thirty minutes. A white solid immediately commenced to precipitate. After standing overnight at room temperature, an additional 35 cc. of methyl iodide was added and the mixture was refluxed with stirring for two hours, then about 200 cc. of solvent (mostly methyl iodide) was removed by distillation. (This reduces the density of the reaction mixture which aids in the subsequent work-up.) The reaction mixture was then cooled in an ice bath and 30 cc. of glacial acetic acid (to decompose the excess sodium hydride), followed by 20 cc. of water were added. The aqueous layer was separated and extracted with 100 cc. of ether, and the combined ether-benzene solutions were extracted exhaustively with 10% sodium carbonate solution, washed with saturated salt solution and dried over anhydrous magnesium sulfate. After the solvent was removed at reduced pressure, the residue was dissolved in 60 cc. of ether, seed crystals were added, and the solution placed in the refrigerator overnight. Colorless prisms, M. P. 94–95° C. of compound IX were thus obtained.

An analytical sample obtained as colorless prisms was prepared by three recrystallizations from 60–68° C. petroleum ether (or methanol), M. P. 95.0–95.5° C.

Anal.—Calcd. for $C_{19}H_{24}O_6$: C, 65.49; H, 6.94. Found: C, 65.69; H, 7.00.

B. By the isolation and subsequent methylation of VIII.—After the system had been brought into equilibrium with a constant pressure eudiometer, a solution of 39.7 g. (0.109 mole) of compound VII in 100 cc. of sodium-dried, thiophene-free benzene and 2 cc. (0.049 mole) of anhydrous methanol was added dropwise to a stirred suspension of 10.2 g. (0.424 mole) of sodium hydride in 400 cc. of refluxing sodium-dried, thiophene-free benzene. After four hours when the hydrogen evolution was slow, the mixture was cooled and 30 cc. of glacial acetic acid was added. After no more gas was evolved, 200 cc. of water was added. The aqueous layer was separated and extracted with 50 cc. of benzene. The combined benzene solutions were extracted with three, 200 cc. portions of 10% sodium carbonate solution, washed with saturated salt solution and dried over anhydrous magnesium sulfate. The solution containing compound VIII was filtered and evaporated to a volume of 250 cc. by distilling off benzene at atmospheric pressure (this also dries the solution.

The benzene solution was added dropwise to a stirred suspension of 2.64 g. (0.11 mole) of sodium hydride in 200 cc. of cold, dry benzene, under a nitrogen atmosphere. Then 142 g. of methyl iodide was added and the reaction mixture was stirred for four hours. A white solid immediately commenced to separate. The reaction mixture was allowed to stand overnight at room temperature, then it was refluxed for four hours. Approximately 75 cc. of solvent was removed by distillation and then the reaction mixture was cooled in an ice bath, and 5 cc. of glacial acetic acid was added slowly to decompose unreacted sodium hydride. After gas was no longer evolved, 200 cc. of water was added. The aqueous layer was separated and extracted with 50 cc. of ether. The combined ether-benzene solution was extracted with three, 200-cc. portions of 10% sodium carbonate solution, and then washed with saturated salt solution and dried over anhydrous magnesium sulfate. After the solvents were removed by distillation at reduced pressure the residue was distilled, B. P. 200–210° C. (0.40 mm.) affording 31.6 g. of a colorless viscous oil. Trituration with ether gave 13.20 g. of colorless microcrystalline compound IX, M. P. 94–95° C.

*Reformatsky reaction of IX with methyl bromoacetate.*—A 1-l, 3-necked round-bottomed flask was fitted with a rubber-sealed Hershberg wire stirrer, an efficient reflux condenser (connected to a mercury trap) and a stopper. The apparatus was evacuated, flame-dried and filled with dry nitrogen, and charged with 250 cc. of sodium-dried benzene, 250 cc. of sodium-dried ether, 13.00 g. (0.0373 mole) of IX, M. P. 95.0–95.5° C., 0.30 g. of iodine, 12 g. of zinc foil (surface cleaned by sandpaper) and 6 cc. of methyl bromoacetate. The stirred solution was placed in an oil bath maintained at 70° C. Within five minutes the iodine color had disappeared and the solution became cloudy. After thirty minutes a colorless addition product was deposited. Five additions of 6 g. of zinc foil were made at intervals of one hour and two additions of 3 cc. of methyl bromoacetate were made at two hour intervals. After six hours of refluxing and stirring the reaction mixture was cooled in an ice bath and 25 cc. of glacial acetic acid was added to dissolve the crystalline complex. The solution was decanted from the zinc into a 2-l. separatory funnel containing 200 cc. of water. The zinc was washed with a mixture of 15 cc. of glacial acetic acid and 100 cc. of ether which was also decanted into the separatory funnel. The aqueous layer was extracted with 100 cc. of ether and the combined ethereal solutions were washed with 200 cc. of water and 400 cc. portions of dilute ammonium hydroxide solution (1 part of concentrated ammonium hydroxide to 3 parts of water), until the aqueous layer was colorless. This usually required approximately three 400 cc. portions. The ether solution was then washed with saturated salt solution and dried over anhydrous magnesium sulfate. After the solvents were removed by distillation at reduced pressure, the yellow oily residue was dissolved in 50 cc. of ether, seeded with the pure α-lactone (XV) (a) (obtained as described below) and allowed to crystallize at room temperature. As soon as any needles began to co-crystallize with the prisms the solution was filtered and the filtrate seeded with needles of the hydroxy ester XVI (R=CH₃) (see below) and allowed to crystallize in the refrigerator for one hour. The colorless needles were separated by filtration and the filtrate again seeded with the α-lactone, and allowed to crystallize at room temperature until needles again began to co-crystallize. By careful repetitions of the seeding process a total of 4.29 g. of the lactone of 6-p-anisyl-3-carbomethoxy - 2 - carbomethoxymethyl - 2 - hydroxy-3-methylcyclohexane-1-acetic acid, XV (a), M. P. 112.5–113.0° C., and 4.40 g. of dimethyl 6 - p - anisyl - 3 - carbomethoxy - 2 - hydroxy - 3-methylcyclohexane-1,2-diacetate, XVI (R=CH₃)

M. P. 100–102° C., were obtained.

An analytical sample of the α-lactone, M. P. 112.5–113.0° C., was obtained as colorless prisms by three recrystallizations from 90–100° C. petroleum ether.

*Anal.*—Calcd. for $C_{21}H_{26}O_7$: C, 64.60; H, 6.71. Found: C, 64.67; H, 6.75.

An analytical sample of the hydroxyester XVI (R=CH₃), M. P. 101.2–101.9° C., was obtained as colorless needles by three recrystallizations from 60–68° C. petroleum ether.

*Anal.*—Calcd. for $C_{22}H_{30}O_2$: C, 62.53; H, 7.16. Found: C, 62.63; H, 7.27.

*Isolation of products from the distilled Reformatsky product.*—A 1-l, 3-necked, round-bottomed flask was fitted with a Hershberg wire stirrer, a stopper, and an efficient reflux condenser (attached to a mercury trap). The apparatus was evacuated, flame-dried and filled with nitrogen. To the flask was added 100 cc. of sodium-dried ether, 100 cc. of sodium-dried benzene, 5.00 g. (0.0144 mole) of ketoester IX, M. P. 95.0–95.5° C., 0.10 g. of iodine, 10 g. of zinc foil (surface cleaned by sandpaper) and 3 cc. of methyl bromoacetate. The flask was then placed in an oil bath maintained at 70° C. and the solution was stirred and refluxed under a nitrogen atmosphere. Within five minutes the iodine color had faded and the solution became cloudy. After one-half hour a colorless addition complex precipitated. Further additions of 5 g. of zinc foil were made at hour intervals and 3 cc. of methyl bromoacetate at two hour intervals. The reaction mixture was refluxed for six hours. The crude yellow oily product was isolated as above and distilled, four fractions (all viscous oils) were collected: (1) 0.134 g., up to 208° C. (0.20 mm.), (2) 0.204 g., 208–215° C. (0.20 mm.), (3) 3.692 g., 222–224° C. (0.20 mm.), (4) 0.597, 224–240° C. (0.20 mm.). No crystalline material was obtained from the first two fractions. Trituration of the third fraction with 25 cc. of ether afforded a microcrystalline solid. Filtration gave 0.794 g. of the α-lactone XV (a), M. P. 110.5–115.5° C. The filtrate was placed in the refrigerator and allowed to crystallize for one hour. Filtration afforded 0.724 g. of the hydroxy ester XVI (R=CH₃), M. P. 100.5–102.0° C. The filtrate seeded with the α-lactone XV (a) was allowed to crystallize for one day at room temperature. Filtration afforded an additional 0.207 g. of the α-lactone, XV (α), M. P. 112.5–113.0° C. as colorless prisms. The solvent was now seeded with the hydroxyester XVI (R=CH₃) and allowed to crystallize in the refrigerator. Filtration afforded an additional 0.073 g. of the hydroxyester XVI (R=CH₃), M. P. 100.5–102.0° C., as colorless needles.

Trituration of the fourth fraction with 10 cc. of ether afforded 0.125 g. of a microcrystalline solid, M. P. 134–136° C. After three recrystallizations from 90–100° C. petroleum ether the lactone of 6-p-anisyl-3-carbomethoxy-2-carbomethoxymethyl - 2-hydroxy-3-methylcyclohexane-1-acetic acid, XV (β) was obtained as colorless needles, M. P. 136.5–137.0° C.

Anal.—Calcd. for $C_{21}H_{26}O_7$: C, 64.60; H, 6.71. Found: C, 64.73; H, 6.80.

*Lactonization of dimethyl 6-p-anisyl-3-carbomethoxy - 2 - hydroxy-3-methylcyclohexane-1,2-diacetate, XVI (R=CH₃).*—A solution of 3.49 g. (0.00827 mole) of the hydroxy ester XVI (R=CH₃), M. P. 101.0–101.5° C., in 10 cc. of 98–100% formic acid was heated for four hours on the steam bath; then the solvent was removed by distillation under reduced pressure and the residue was triturated with 25 cc. of ether. This afforded 3.05 g. of fine needles, M. P. 136.0–136.5° C. The melting point on admixture with an analytical sample of XV (β) melted at 136.5–137.0° C.

*Methyl 5-p-anisyl-2-carbomethoxy-6-carboxymethyl - 2 - methylcyclohexylidene - 1 - acetate, XVII.*—A. *By the hydrolysis of the α-lactone, XV (α).*—A solution of 5.85 g. (0.015 mole) of the α-lactone, M. P. 112.5–113.0° C., in 200 cc. methanol and 16.0 cc. of 0.969 N sodium hydroxide was refluxed for one hour. The solvent was removed by distillation at reduced pressure, 50 cc. of water was added and the solution was acidified. The oil that precipitated was taken up in 80 cc. of ether, washed with saturated salt solution and dried over anhydrous magnesium sulfate. The solvent was removed by distillation at reduced pressure and the residue was dissolved in a mixture of 30 cc. of benzene and 30 cc. of 60–68° C. petroleum ether; seed crystals were added and the unsaturated acid was allowed to crystallize at room temperature. The yield of large colorless prisms was 4.13 g., M. P. 121–122° C. By concentrating the mother liquors an additional 0.400 g., M. P. 121–122° C., was obtained by crystallization. Thus the total yield was 4.53 g. of compound XVII, M. P. 121–122° C.

The analytical sample of XVII obtained as colorless prisms, M. P. 121.1–121.9° C. was prepared by three recrystallizations from an equal mixture of benzene and 60–68° C. petroleum ether.

Anal.—Calcd. for $C_{21}H_{26}O_7$: C, 64.60; H, 6.71. Found: C, 64.92; H, 6.78.

Essentially the same result was obtained when a solution of 0.390 g. (0.001 mole) of the lactone in 15 cc. of methanol and 1.00 cc. of N sodium hydroxide was allowed to stand at room temperature for one week. When the reaction product was isolated as above the unsaturated acid, M. P. 121–122° C., was obtained.

The methyl ester (0.383 g.) (94.8% yield) prepared by the action of ethereal diazomethane on 0.390 g. of the unsaturated acid, M. P. 121–122° C., was obtained as colorless prisms, M. P. 75.0–75.5° C. After three recrystallizations from 60–68° C. petroleum ether the melting point was 75.2–75.8° C., λ max. 276.5 m$\mu$ (log E=4.196), λ min. 263 m$\mu$ (log E=3200).

Anal.—Calcd. for $C_{22}H_{28}O_7$: C, 65.33; H, 6.98. Found: C, 65.19; H, 7.10.

B. *From the β-lactone, XV (β).*—A solution of 1.40 g. (0.00359 mole) of the β-lactone, M. P. 136.0–136.5° C. in 50 cc. of methanol and 3.80 cc. of 0.969 N sodium hydroxide was refluxed for three hours. On working up the reaction mixture as above, 0.680 g. of the unsaturated acid XVII, M. P. 121–122° C., was obtained.

In addition to the unsaturated acid, a colorless solid, M. P. 180.8–181.8° C. was obtained from the hydrolysis of the β-lactone when the refluxing period was 90 minutes. After three recrystallizations from methanol, 6-p-anisyl-3-carbomethoxy - 2 - carbomethoxymethyl - 2 - hydroxy - 2 - methylcyclohexane - acetic acid XVI (R=H), was obtained as colorless prisms, M. P. 181.8–182.8° C. (dec.) (when immersed at 176° C. and the rate of heating was 1° C. per minute).

Anal.—Calcd. for $C_{21}H_{28}O_8$: C, 61.75; H, 6.91. Found: C, 61.98; H, 7.05.

When 25 mg. of the hydroxy acid, M. P. 180.8–181.8° C. (dec.), was allowed to react with an excess of diazomethane, 25 mg. of the hydroxy acid XVI (R=CH₃), M. P. 100–101° C., was obtained. No depression in the melting point was observed on admixture with the analytical sample obtained from the Reformatsky reaction.

C. *From the crude solid Reformatsky product.*—A 1-l, 3-necked, round-bottomed flask was fitted with a Hershberg wire stirrer, a stopper, and an efficient reflux condenser (attached to a mercury trap). The apparatus was evacuated, flame-dried and filled with nitrogen. To the flask (maintained in a nitrogen atmosphere) were added 100 cc. of sodium-dried ether, 100 cc. of sodium-dried benzene, 6.96 g. (0.002 mole) of ketoester IX, M. P. 94–95° C., 0.25 g. of iodine, 6 g. of zinc foil (surface cleaned by sandpaper) and 3 cc. of methyl bromoacetate. The flask was placed in an oil bath maintained at 70° C. and the solution was stirred and refluxed under a nitrogen atmosphere. Within five minutes the iodine color had faded and the solution became cloudy. After fifteen minutes a colorless addition complex separated. Further additions of 3 g. of zinc foil were made at one hour intervals and 3 cc. of methyl bromoacetate at two hour intervals. The reaction mixture was stirred and refluxed for six hours. To the cooled reaction mixture was added 25 cc. of glacial acetic acid to dissolve the colorless crystalline addition complex. The solution was decanted into a separatory funnel containing 200 cc. of water. The zinc foil was washed with a mixture of 100 cc. of ether and 25 cc. of glacial acetic acid, the washings being decanted into the separatory funnel. The aqueous layer was discarded and the ether-benzene solution was washed with 200 cc. of water, four 200 cc. portions of dilute ammonium hydroxide (1 part concentrated ammonium hydroxide to 3 parts of water), two 200 cc. portions of saturated salt solution and dried over anhydrous magnesium sulfate. After the solvent was removed by distillation at reduced pressure, the yellow, oily residue was dissolved in 75 cc. of ether, placed in the refrigerator and allowed to crystallize for twenty-four hours. Filtration afforded 5.68 g. of a colorless product (a mixture of needles and prisms), M. P. 93–98° C. This crude product was dissolved in 25 cc. of 98–100% formic acid and heated on the steam bath for three hours. The excess formic acid was removed by distillation at reduced pressure and 25 cc. of ether was added. The solid product that crystallized was separated by filtration and washed well with ether, M. P. 106–125° C. The filtrate was transferred to a separatory funnel, washed with 20 cc. of water, two 20 cc. portions of 10% sodium carbonate solution, 20 cc. of saturated salt solution and dried over anhydrous magnesium sulfate. The solvent was removed by distillation at reduced pressure affording 0.60 g. of a yellow oil. The oil was combined with the crystalline material, which was assumed to be essentially a mixture of lactones. This material was dissolved in 160 cc. of methanol and 13.0 g. of 0.983 N sodium hydroxide. After refluxing for three hours the solvent was removed by distillation at reduced pressure, 50 cc. of water was added and the solution was acidified. The oil that precipitated was taken up in 80 cc. of ether, washed with saturated salt solution and dried over anhydrous magnesium sulfate. The solvent was removed by distillation under reduced pressure and the yellow oily residue dissolved in a mixture of 15 cc. of benzene and 15 cc. of 60–68° C. petroleum ether, seeded with the pure unsaturated acid XVII and allowed to crystallize for two days at room temperature. Filtration afforded 2.122 g. of the acid XVII, M. P. 121–122° C. Concentration of the mother liquors gave 0.400 g. of XVII as colorless prisms, M. P. 121–122° C.

Methyl 2 - carbomethoxy - 9 - keto - 7 - methoxy - 2 - methyl - 1,2,3,4,4a,9,10,10a - octahydrophenanthrylidene-1-acetate, XVIII.—To a cool (ice bath) solution of 1.590 g. of XVII, M. P. 121–122° C., in 10 cc. of dry methylene chloride were added 2 drops of pyridine and 1.0 cc. of purified thionyl chloride. The mixture was allowed to stand at room temperature for three hours, then the solvents were removed at room temperature by distillation under reduced pressure (water pump). Four additions of 5 cc. of methylene chloride were made, the solvents being removed at reduced pressure and room temperature after each addition. The syrupy residue, dissolved in 10 cc. of methylene chloride, was added over a period of fifteen minutes to a stirred suspension of 2.03 g. of anhydrous aluminum chloride in 30 cc. of methylene chloride, contained in a 200 cc. round-bottomed flask immersed in an ice bath. A yellow complex formed as the acid chloride was added. The mixture was stirred for seventy-five minutes, then the ice bath was removed and stirring continued for another seventy-five minutes. Ice, 5 cc. of concentrated hydrochloric acid and 100 cc. of ether were added and the mixture was transferred to a separatory funnel. The aqueous layer was separated and the ether-methylene chloride solution was washed in succession with 25 cc. of water, 50 cc. of 5% potassium hydroxide solution (which produced only a faint cloudiness on acidification), and two 30-cc. portions of saturated salt solution. After being dried over magnesium sulfate, the solvent was removed at reduced pressure leaving a semi-crystalline solid residue. This was dissolved in 40 cc. of methanol and allowed to crystallize. A first crop yield of colorless prisms, M. P. 147.8–148.4° C. was obtained. The solution on being evaporated to 8 cc. afforded a second crop of light-yellow prisms, M. P. 147.8–148.4 C. The melting point of this compound (XVIII) could not be improved by recrystallization from methanol.

Anal.—Calcd. for $C_{21}H_{24}O_6$: C, 67.72; H, 6.50. Found: C, 68.02; H, 6.94. C, 68.19; H, 6.46.

Catalytic hydrogenation of the unsaturated acid, XVII.—A. By the use of 30% palladium hydroxide - on - strontium - carbonate.—Preparation of the catalyst.—A solution of 20.32 g. of palladium chloride in 400 cc. of distilled water was added with vigorous stirring to 53.3 g. of strontium carbonate suspended in 200 cc. of water. The mixture was kept at 80° C. until all the palladium had been precipitated as palladium hydroxide. The precipitated product was washed by decantation with distilled water until it was found to be chloride-free. It was then separated by filtration, dried to constant weight at 85° C., and then ground up in a mortar and stored in a well-stoppered bottle.

Reduction.—A suspension of 0.500 g. of palladium-hydroxide-on-strontium carbonate (prepared as above), in 35 cc. of 95% ethanol (distilled from Raney nickel) was reduced and equilibrated at atmospheric temperature and pressure, with hydrogen. A solution of 4.10 g. of the unsaturated acid XVII, M. P. 121–122° C., in 75 cc. of 95% ethanol was then added, and after forty-eight hours, the calculated amount of hydrogen was absorbed and the up-take of gas ceased. The reaction mixture was filtered and the solvent was removed by distillation at reduced pressure. The residue, a colorless viscous oil, was dissolved in 40 cc. of boiling benzene and a small amount of insoluble material was separated by filtration. The product was allowed to crystallize overnight at room temperature. Filtration afforded colorless prisms of 6 - p - anisyl - 3 - carbomethoxy-2 - carbomethoxy - methyl - 3 - methylcyclohexane-1-acetic acid, XXI (a), M. P. 172–173° C. The analytical sample (M. P. 173.8–174.3° C.) was obtained as colorless prisms by three recrystallizations from benzene.

Anal.—Calcd. for $C_{21}H_{28}O_7$: C, 64.28; H, 7.19. Found: C, 64.24; H, 7.22.

Dilution of the mother liquor with an equal volume of 60–68° C. petroleum ether, afforded a colorless solid, M. P. 118–126° C. After three recrystallizations from a mixture of benzene and 60–68° C. petroleum ether, the pure β-acid XXI (β), M. P. 126.0–126.4° C., was obtained as colorless prisms.

Anal.—Calcd. for $C_{21}H_{28}O_7$: C, 64.28; H, 7.19. Found: C, 64.24; H, 7.35.

B. By the use of 30% palladium-on-charcoal in an acetic acid solution.—A mixture of 2.100 g. of XVII, M. P. 121–122° C., 1.000 g. of 30% palladium-on-charcoal, and 35 cc. of glacial acetic acid (distilled from potassium permanganate) was stirred in an atmosphere of hydrogen at room temperature. An additional 1.000 g. of catalyst was added after seven hours. After a further nineteen hours the absorption was 150% of the calculated and the rate of hydrogenation was very slow. The mixture was then filtered and the acetic acid was removed by distillation under diminished pressure. The oily residue was dissolved in 30 cc. of benzene and the product allowed to crystallize at room temperature. Filtration afforded XXI (a) as colorless prisms, M. P. 172.5–174.0° C.

The methyl ester of XXI (a).—(A). From XXI (a).—When treated with ethereal diazomethane, 25 mg. of XXI (a), M. P. 172–173° C. afforded 25 mg. of the methyl ester, M. P. 115–115.5° C. One crystallization from methanol gave colorless prisms, M. P. 115.1–115.5° C.

(B). From the hydrogenation of the crude product from dehydration of XVI (R=CH₃).—In a 25 cc. round-bottomed flask, fitted with a calcium chloride tube were placed 8 cc. of sodium-dried ether, 2 cc. of dry pyridine and 4 cc. of purified thionyl chloride. The mixture was cooled in an ice bath and 1.688 g. of XVI (R=CH₃), M. P. 101–102° C., was added in small portions. A white solid separated as the solution was allowed to stand at 0° for one hour. The solvents were then decanted from the white solid (presumably pyridine hydrochloride) into a mixture of ice and 5 cc. of concentrated hydrochloric acid. The aqueous layer was separated and extracted with 10 cc. of ether. The combined solutions were washed in succession with water, dilute hydrochloric acid, water, 5% sodium carbonate solution and saturated salt solution. After being dried over anhydrous magnesium sulfate, the ether was removed at reduced pressure and the residue evaporatively distilled, 180° C. (0.05 mm.) affording a glass, presumably the unsaturated ester. The glass was dissolved in ether and shaken with one-half teaspoonful of Raney nickel. The solution was filtered and the ether was removed under reduced pressure and the residue was dissolved in 25 cc. of 95% ethanol and hydrogenated at atmospheric temperature and pressure over 0.500 g. of pre-reduced 30% palladium hydroxide-on-strontium carbonate (prepared as described above). The solution was filtered and solvent removed in a current of dry air, and the oily residue dissolved in a mixture of 10 cc. of ether and 10 cc. of 40–60° C. petroleum ether. Crystallization and filtration afforded colorless prisms, M. P. 110–111° C. Two recrystallizations from methanol gave colorless prisms, M. P. 115.0–115.5° C. The melting point was 115.0–115.5° C. on admixture with material (M. P. 115.0–115.5° C.) from procedure (A).

*Dimethyl 9-ketomarrianolate methyl ether, XXII* (a).—A. *Cyclization of the acid chloride of XXI* (a) *with aluminum chloride using methylene chloride as the solvent.*—In a 50 cc. round-bottomed flask, immersed in an ice bath were placed 1.500 g. of XXI (a), M. P. 172–173° C., 10 cc. of methylene chloride (dried over calcium chloride and distilled), and 2 drops of pyridine. To the cool solution was added 1.0 cc. of purified thionyl chloride and the mixture was allowed to stand for two hours at room temperature. The solvent was evaporated at reduced pressure and four, 5 cc. portions of methylene chloride were added, the solvent being removed at reduced pressure after each addition. The residue (presumed to be the acid chloride), dissolved in 10 cc. of methylene chloride, was transferred to a separatory funnel and added dropwise over a period of fifteen minutes to a stirred suspension of 1.90 g. of anhydrous aluminum chloride in 30 cc. of methylene chloride. As the acid chloride was introduced a yellow complex formed. The mixture was stirred for one and one-half hours in an ice bath and then another one and one-half hours at room temperature. Ice, 5 cc. of concentrated hydrochloric acid and 100 cc. of ether were then added and the mixture was transferred to a separatory funnel. The ether-methylene chloride solution was washed with 50 cc. of water, 50 cc. of 5% potassium hydroxide solution, two, 50 cc. portions of saturated salt solution and dried over anhydrous magnesium sulfate. The solvents were removed by distillation at reduced pressure leaving a colorless solid, M. P. 149–151° C. One recrystallization from 35 cc. of methanol afforded compound XXII (a) as colorless needles, M. P. 153.6–154.0° C. In earlier experiments a lower melting polymorph, M. P. 145.4–145.8° C., was encountered (see below).

B. *Cyclization of the acid chloride of XXI* (a) *with aluminum chloride using benzene as a solvent.*—To a suspension of 0.585 g. of XXI (a), M. P. 172–173° C. in 10 cc. of benzene, at intervals of fifteen minutes, were added three 0.130 g. portions of phosphorous pentachloride. As the solution was allowed to stand at room temperature for one and one-quarter hours the solids gradually dissolved. The solvent was removed at reduced pressure and another 5 cc. of benzene was added and subsequently removed under reduced pressure. The residue (presumably the acid chloride) was dissolved in 10 cc. of benzene and added over a period of fifteen minutes to a stirred suspension of 0.600 g. of anhydrous aluminum chloride in 20 cc. of benzene. As the acid chloride was introduced a yellow complex formed. The mixture was stirred for one hour in an ice-bath and then two hours at room temperature. Ice and 5 cc. of concentrated hydrochloric acid were added and the mixture was transferred to a separatory funnel. The aqueous layer was discarded and the benzene solution was washed with 20 cc. of 3% sodium carbonate solution, 20 cc. of 5% potassium hydroxide solution, two 25 cc. portions of saturated salt solution and dried over anhydrous magnesium sulfate. The benzene was removed by distillation at reduced pressure leaving an oil, which on trituration with a little ether afforded a colorless solid, M. P. 142–143° C.

C. *Cyclization of XXI* (a) *with anhydrous hydrogen fluoride.*—A solution of 0.100 g. of XXI (a), M. P. 172–173° C., in approximately 10 cc. of anhydrous hydrogen fluoride was allowed to stand in a closed copper-lined steel bomb for twenty-two hours. After most of the hydrogen fluoride had been removed in a current of air, ice was introduced into the bomb, and the aqueous solution decanted into a separatory funnel containing 60 cc. of ether. The aqueous layer was extracted with the ether and discarded. The ether solution was then washed with water, 10% sodium carbonate solution, and saturated salt solution and dried over anhydrous magnesium sulfate. After the solvent was removed an oil remained. Trituration with a little ether afforded a colorless solid, M. P. 140–142° C. On admixture with a sample prepared according to procedure B (M. P. 142–143° C.) the melting point was 140–142° C.

The sample which was analyzed was the lower melting polymorph, M. P. 145.4–145.8° C., prepared according to procedure B. On admixture with a sample prepared according to procedure A (M. P. 153.6–154.0° C.), the analytical sample melted at 153.6–154.0° C.

*Anal.*—Calcd. for $C_{21}H_{26}O_5$: C, 67.36; H, 7.00. Found: C, 67.14; H, 7.10.

*Dimethyl 9-hydroxymarrianolate methyl ether, XXIII.*—A suspension of 0.200 g. of 30% palladium hydroxide-on-strontium carbonate (prepared as described above) in 25 cc. of ethyl acetate was equilibrated with hydrogen at room temperature and pressure. To this mixture was added a solution of the unsaturated ketoester XVIII, M. P. 147.8–148.4° C., in 35 cc. of ethyl acetate. Absorption of hydrogen ceased when two mole equivalents of hydrogen had been absorbed after twenty-two hours. The reaction mixture was filtered, the solvent removed by distillation at reduced pressure, and the oily residue dissolved in 7 cc. of ether. After standing twenty-four hours in the refrigerator, filtration afforded colorless prisms, M. P. 113.4–114.8° C. Recrystallization from dilute methanol gave colorless prisms of XXIII, M. P. 111.9–114.8° C.

Anal.—Calcd. for $C_{21}H_{28}O_6$: C, 67.00; H, 7.50. Found: C, 66.93; H, 7.38.

The keto group of XVIII can be converted to the

group present in XXIII, by reduction using the Meerwein Ponndorff Verley reaction. The resulting product, methyl 2-carbomethoxy-9-hydroxy-7-methoxy-2-methyl-1,2,3,4,4a,9,10,10a-octahydrophenanthrylidene-1-acetate, corresponds to XVIII except that the keto group at the 9-position is reduced to a

group.

*Methyl 7-methoxy-2-carbomethoxy-2-methyl-1,2,3,4,4a,9,10,10a-octahydrophenanthrylidene-1-acetate, XIX.*—A mixture of 0.913 g. of ketoester XVIII, M. P. 147.8–148.4° C., 0.200 g. of 30% palladium-on-charcoal, 0.20 cc. of 60% perchloric acid and 30 cc. of glacial acetic acid, were hydrogenated at atmospheric pressure and temperature. The reaction was stopped after eighty minutes when two mole equivalents of hydrogen had been absorbed, at which time the rate of absorption of gas had slowed appreciably. The reaction mixture was filtered and transferred to a separatory funnel containing 40 cc. of ether. The ether-acetic acid solution was washed with three 30 cc. portions of water and then three 30 cc. portions of 10% sodium carbonate solution. The aqueous extracts were in turn extracted with 40 cc. of ether contained in two other separatory funnels. The combined ether solutions were washed with saturated salt solution and dried over anhydrous magnesium sulfate. The ether was removed by distillation at reduced pressure, 8 cc. of hot methanol was added and the solution filtered from a small amount of insoluble yellow oil, an additional 5 cc. of methanol being used for transferring and washing. After standing at room temperature overnight, then two hours in the refrigerator, filtration afforded colorless prisms, M. P. 111.4–111.8° C. Four recrystallizations from methanol gave colorless prisms of XIX, M. P. 112.0–112.2° C.

Anal.—Calcd. for $C_{21}H_{26}O_5$: C, 70.37; H, 7.31. Found: C, 70.22; H, 7.39.

*Dimethyl 9-ketomarrianolate methyl ether, XXII (β).*—A. *From the cyclization of the acid chloride of XXI (β).*—In a 10 cc. round-bottomed flask were placed 0.300 g. of XXI (β), M. P. 122–124° C., 5 cc. of methylene chloride (dried over calcium chloride and distilled), 2 drops pyridine and 0.5 cc. of purified thionyl chloride. After standing for two hours at room temperature the solvents were removed by distillation at reduced pressure and four additions of 5 cc. of methylene chloride were made, the solvent being removed at reduced pressure after each addition. The acid chloride was added dropwise over a period of five minutes to a stirred suspension of 0.38 g. of aluminum chloride in 10 cc. methylene chloride contained in a 200 cc. round-bottomed flask immersed in an ice bath. A yellow complex formed as the acid chloride was added. After two hours, the ice bath was removed and stirring was continued for two hours at room temperature. Ice, 2 cc. of concentrated hydrochloric acid and 30 cc. of ether were added. The aqueous layer was separated and the ether-methylene chloride solution was washed in succession with 25 cc. water, 25 cc. of 5% potassium hydroxide solution and two 25 cc. portions of saturated salt solution. After drying over anhydrous magnesium sulfate, the solvent was removed at reduced pressure leaving an oil which on trituration with ether and 40–60° C. petroleum ether afforded a solid (XXII-β), M. P. 104.0–104.5° C. The analytical sample was obtained as long white needles, by two recrystallizations from 5 cc. methanol, M. P. 104.2–104.6° C.

Anal.—Calcd. for $C_{21}H_{26}O_6$: C, 67.36; H, 7.00. Found: C, 67.44; H, 7.06.

B. *From the Oppenauer oxidation of dimethyl 9-hydroxymarrianolate methyl ether, XXIII.*—In a 250-cc., 2-necked, flame-dried, round-bottomed flask, fitted with a dropping funnel (with equal-pressure side arm) and a condenser, set for distillation, were placed 30 cc. of sodium-dried toluene, 3 cc. of freshly distilled cyclohexanone and 0.250 g. of XXIII, M. P. 113.4–114.8° C. After approximately 10 cc. of toluene had been distilled through the condenser, and the distillate was clear, a solution of 0.30 g. of aluminum isopropoxide in 10 cc. of toluene was added over a period of one-half hour as toluene was slowly distilled out. After the addition was complete, the slow distillation of toluene was continued for one-half hour. The solution was cooled and 3 cc. of a concentrated solution of Rochelle salt was added. The solution was were removed by steam distillation and the aqueous solution was extracted with two 50 cc. portions of ether. The ether was washed with a saturated salt solution and dried over anhydrous magnesium sulfate. The solvent was removed by distillation at reduced pressure and the residual oil was dissolved in 3 cc. methanol, separated from a small amount of insoluble oil by filtration and allowed to crystallize at room temperature. Decantation of the mother liquor, afforded colorless needles of XXII (β), M. P. 103.2–104.2° C.

*Dimethyl marrianolate methyl ether, XX (β).*—A. *From the hydrogenation of dimethyl 9-ketomarrianolate methyl ether, XXXII (β).*—To a solution of 0.125 g. of ketoester XXII (β), M. P. 103.2–104.6° C. in 20 cc. of acetic acid (distilled from potassium permanganate) were added 0.100 g. of 30% palladium-on-charcoal and 0.10 cc. of 60% perchloric acid. The mixture was stirred at atmospheric temperature and pressure with hydrogen. The calculated amount of gas was absorbed in one hour, at which time absorption was slow. The mixture was filtered and the product isolated in a similar manner to that of the hydrogenolysis of the unsaturated ketoester XVIII. Crystallization afforded colorless needles, M. P. 98.6–99.0° C. The analytical sample of XX (β) was obtained as colorless needles after five recrystallizations from methanol, M. P. 99.6–99.9° C.

Anal.—Calcd. for $C_{21}H_{28}O_5$: C, 69.97; H, 7.83 Found: C, 70.18; H, 7.84.

B. *From the unsaturated dimethyl marrianolate methyl ether, XIX.*—A suspension of 0.500 g. of palladium hydroxide-on-strontium carbonate in 25 cc. of ethyl acetate was reduced and equilibrated with hydrogen at atmospheric temperature and pressure. To this was added a solution of 0.699 g. of XIX, M. P. 111.4–111.8° C., in 25 cc. of ethyl acetate After twenty-four hours absorption of hydrogen ceased, the mixture was filtered and the solvent removed at reduced pressure leaving an oil which was dissolved in 10 cc. of hot methanol. After standing four hours the colorless prisms of XX (β) were separated by filtration, M. P. 98.2–99.2° C.

*Dimethyl marrianolate methyl ether, XX (α).—* In a hydrogenation flask were placed 0.648 g. of the ketoester XXII (α), M. P. 153.5–154.0° C., 0.2 g. of 30% palladium-on-charcoal, 0.20 cc. of 60% perchloric acid and 25 cc. of glacial acetic acid (distilled from potassium permanganate). The mixture was stirred at room temperature and pressure with hydrogen. After one hour, at which time the rate of absorption had slowed appreciably, the calculated amount of gas was absorbed, the reaction mixture was filtered and the hydrogenation product isolated in a similar manner to that described above for the hydrogenolysis of ketoester XVIII. Crystallization from 5 cc. of methanol afforded white needles of XX (α), M. P. 89.5–90.0° C.

*Anal.*—Calcd. for $C_{21}H_{28}O_5$: C, 69.97; H, 7.83. Found: C, 70.14; H, 7.98.

*2-carbomethoxy-7-methoxy-2-methyl-1,2,3,4,-4a,9,10,10a-octahydrophenanthrene-1-acetic acid, XXIV (β).—* A solution of 0.596 g. of dimethyl marrianolate methyl ether XX (β), M. P. 99.6–99.9° C., in 15 cc. of methanol and 1.86 cc. of 0.969 N sodium hydroxide solution (1.1 eq.) was refluxed for fifteen and one-half hours. The solution was evaporated at reduced pressure, 30 cc. of water was added and the solution was extracted with 25 cc. of ether, to remove traces of unchanged diester. After acidification with dilute hydrochloric acid the precipitated oil was extracted with 50 cc. of ether. The ethereal solution after being washed with two 25 cc. portions of saturated salt solution, was dried over anhydrous magnesium sulfate. The solvent was removed at reduced pressure and the residue dissolved in 10 cc. of methanol. A first crop of colorless prisms, M. P. 174.8–175.6° C., was obtained. On concentration, the mother liquor afforded an additional XXIV (β), M. P. 174.0–175.6° C.

*Anal.*—Calcd. for $C_{20}H_{26}O_5$: C, 69.34; H, 7.57. Found: C, 69.54; H, 7.81.

*2-carbomethoxy-7-methoxy-2-methyl-1,2,3,4,-4a,9,10,10a-octahydrophenanthrene-1-acetic acid, XXIV (α).—* A solution of 0.810 g. of dimethyl marrianolate methyl ether, XX (α), M. P. 89.5–90.0° C., in 20 cc. of methanol and 2.55 cc. (1.1 eq.) of 0.969 N sodium hydroxide solution was refluxed for fifteen and three-quarter hours. The solvent was removed by distillation at reduced pressure and the difficultly soluble residue dissolved in 125 cc. of water. The aqueous solution was extracted with two 25 cc. portions of ether to remove unchanged diester. The acidified solution was extracted with two 30 cc. portions of ether which was then washed with saturated salt solution and dried over anhydrous magnesium sulfate. The solvent was removed by distillation at reduced pressure and the residue was crystallized from 5 cc. of methanol. This afforded XXIV (α) as colorless needles, M. P. 167.0–167.8° C. A second crop, M. P. 166–167.8° C., was obtained by concentration of the mother liquor.

*Anal.*—Calcd. for $C_{20}H_{26}O_5$: C, 69.34; H, 7.57. Found: C, 69.00; H, 7.33.

*Homomarrianolic acid methyl ether, XXV (β).—* In a 10-cc. pear-shaped flask were placed 0.328 g. of XXIV (β), M. P. 174.8–175.6° C., 1 cc. benzene and 2 drops of pyridine. To the cool mixture was added 0.50 cc. of purified thionyl chloride. The reaction mixture, which gradually turned yellow, was allowed to stand at room temperature for two hours. The solvent was removed by distillation at reduced pressure (water-pump) and room temperature and another 1 cc. of benzene was added to the reaction mixture, the solvent again being removed by distillation at reduced pressure at room temperature. The oily product was dissolved in 2 cc. of benzene and filtered into a dropping funnel (with a pressure equalizing side arm) fitted to a 25 cc. round-bottomed flask (ground glass). The acid chloride was added dropwise to an ice cold ethereal diazomethane solution (prepared from 2.0 g. of nitrosomethylurea, dried three hours over potassium hydroxide and then distilled). After the reaction mixture had stood over-night at 0°, the solvent was removed by distillation at reduced pressure, leaving a yellow viscous oil (presumably the diazoketone). The oil was dissolved in 15 cc. of methanol, the solution heated to 55° C. (bath temperature) and 0.350 g. of freshly prepared silver oxide (by the interaction of dilute sodium hydroxide and 10% silver nitrate, washed by decantation, filtered and dried) was added over a period of one hour, whereupon nitrogen was evolved. The solution was then refluxed for one hour and an additional 0.150 g. of silver oxide was added and the mixture refluxed for two more hours. The mixture was filtered and the solvent removed by distillation at reduced pressure. The product, a viscous oil, was transferred by means of 5 cc. of methanol to a 500-cc. stainless steel flask which contained 5 cc. of 50% potassium hydroxide solution. The mixture was refluxed for twenty-four hours, filtered from some brown insoluble material and then acidified. The acidified solution was extracted with two portions of ether; 40 cc. and 20 cc. The combined ethereal solutions were washed with a saturated salt solution and dried over anhydrous magnesium sulfate. The solvent was removed by distillation at reduced pressure leaving an oil which was dissolved in 20 cc. of ethyl acetate. The solution was allowed to crystallize for two hours in the refrigerator, then filtered, affording homomarrianolic acid methyl ether, XXV (β), M. P. 219.1–220.5° C. Three recrystallizations from ethyl acetate afforded colorless prisms, M. P. 224.2–226.8° C.

*Homomarrianolic acid methyl ether, XXV (α).—* The procedure followed was identical with that of the previous experiment. The acid chloride formed by the interaction of 0.250 g. of XXIV (α), M. P. 167.0–167.8° C. with 0.50 cc. of thionyl chloride was added to an ice-cold ethereal diazomethane solution (prepared from 2.0 g. of nitrosomethylurea). The oily diazoketone (isolated as above) was dissolved in 15 cc. of methanol, the solution heated to 55° C. and treated with 0.500 g. of silver oxide (as described above). The product isolated was hydrolyzed by refluxing with a mixture of 5 cc. of methanol and 5 cc. of 50% potassium hydroxide solution for twenty-four hours. The solution was separated from some brown insoluble material by filtration and then acidified. The acidified solution was extracted with two portions of ether; 40 cc. and 20 cc. The combined ethereal solutions were washed with a saturated salt solution and dried over anhydrous magnesium sulfate. The solvent was removed by distillation at reduced pressure, leaving an oil. On trituration with a small amount of ether, a light brown solid, M. P. 230–232° C., was obtained. The analytical sample was prepared by two recrystallizations from ethyl acetate followed by a micro-sublimitation, 220° C. (0.02 mm.). Colorless prisms of XXV (α) melting at 233.6–234.6° C. were thus obtained.

*dl-Estrone methyl ether, XXVI (β).—* The procedure used was essentially that of Anner and Miescher, supra. An intimate mixture of 0.172 g.

of crude dl-homomarrianolic acid methyl ether, XXV (β), M. P. 214.4–220.5° C. and 0.178 g. of lead carbonate was placed in the lower bulb, formed in a piece of 10 mm. Pyrex tubing by sealing one end and making a constriction 7 cm. from the bulb. A plug of Pyrex glass wool was placed above the mixture, the apparatus was evacuated to 0.05 mm.; and the bulb was placed in a horizontal opening in an aluminum block heated to 300° C. The pressure rose to about 1 mm. and a distillate appeared beyond the constriction. Heating at 300° C. was continued for ten minutes, during which time the pressure in the system returned to 0.05 mm. The temperature of the block was lowered to 190° C. and the tube was inserted in another hole which had an attached copper sleeve of 7 cm. The oil was evaporatively distilled beyond the copper sleeve giving an oil which solidified, M. P. 138.4–140.4° C. One crystallization from methanol afforded XXVI (β) as colorless prisms, M. P. 143.2–144.2° C.

*Estrone methyl ether, XXVI (a).*—In a manner similar to the previous experiment, 0.077 g. of the homomarrianolic acid methyl ether XXV (a), M. P. 231–233° C., mixed with 0.080 g. of lead carbonate was heated at 300° C. (0.05 mm.) for twenty minutes. The oily distillate on evaporative distillation at 200° C (0.05 mm.) gave a colorless solid, M. P. 114.4–117.0° C. Three recrystallizations from methanol afforded XXVI (a) as colorless needles, M. P. 120.6–121.0° C.

*Estrone, XXVII (a).*—The method used for cleaving methyl ethers was essentially that described in J. Am. Chem. Soc. 72, 1426 (1950). In a 25-cc. round-bottomed flask fitted with an air condenser (both flame-dried) were placed 0.070 g. of estrone methyl ether, XXVI (a), M. P. 114.4–117.4° C. and 1.5 g. of freshly prepared pyridine hydrochloride. The flask was immersed in an oil bath which was rapidly heated to 205° C. The flask was evacuated and filled with nitrogen several times to remove traces of air. After the reaction mixture was heated at 205–210° C. for forty minutes it was cooled and 3 cc. of 5% hydrochloric acid was added. The solution was extracted with ether, which in turn was extracted with six 10 cc. portions of 5% potassium hydroxide solution. Acidification and filtration afforded a micro-crystalline solid, M. P. 211.2–214.1° C. Two recrystallizations from methanol, followed by a micro-sublimation at 190° C. (0.05 mm.) gave XXVII (a) as a colorless microcrystalline solid, M. P. 215.8–216.8° C.

The invention has been illustrated with a methoxy group on the ring in compound VII and the other intermediates including compound XXVI where it appears on ring A. The methyl group, as explained above, protects the potential hydroxyl group required for ring A of estrone (XXVII), and the CH3O may be replaced by other RO groups where R is a lower alkyl group such as ethyl, propyl, etc. The invention has also been illustrated by showing various intermediates as methyl esters, see, for example, compounds XV, XVI, XVII, XVIII, XXI, XXII and XXIII. The COOCH3 groups shown here may be replaced by other COOR′ groups where R′ represents a lower alkyl group such as ethyl, propyl, etc. The various esters may be prepared by treatment of the corresponding free acids with diazo lower alkanes or prepared by other known esterification methods. In compound XVI, the R in the CH2COOR group at the 1-position may be hydrogen or a lower alkyl group. Compound XVI undergoes dehydration to form the lactone XV. In compounds XVII and XXI, the CH2COOH group at the 6-position may be esterified with a lower alkyl group. The two ring compounds XVII and XXI are similar except that the acetate group at the 1-position (identified as "X" in the claims) is =CHCOOR″ in compound XVII and

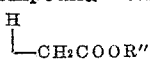

in compound XXI. Three ring compounds XVIII, XXII and XXIII are also similar except for the acetate or "X" group on ring C. The keto group at the 9-position in compounds XVIII and XVII has also been reduced in compound XXIII. These two groups

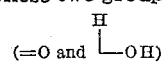

are termed "Y" in the claims.

Various modifications in the processes described above will be apparent to those skilled in the art. The acid halides, for example, may be prepared by employing a halide of a strong acid derived from an acid having a dissociation constant of at least about $10^{-3}$. Examples are phosphorus trichloride, phosphorus oxychloride, oxalyl chloride, thionyl bromide, etc. as well as the halides referred to in the detailed disclosure. Also, in place of the Friedel-Crafts catalyst described above any of the Friedel-Crafts type catalysts such as stannic chloride, zinc chloride, boron trifluoride, and the like may be employed.

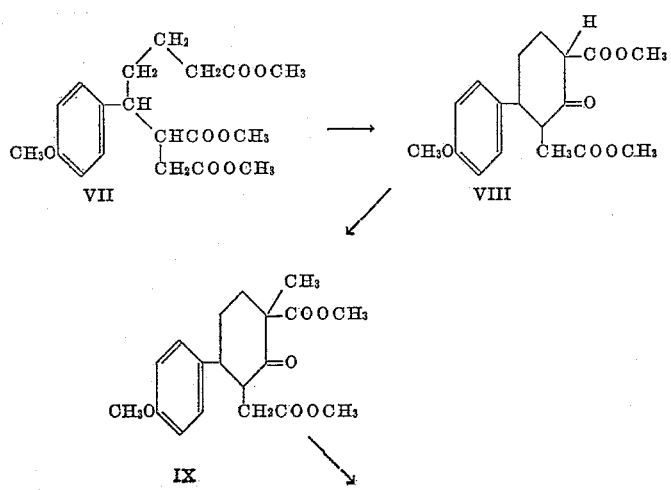

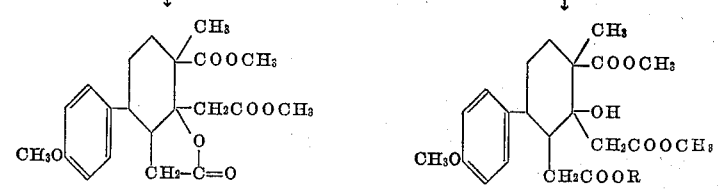
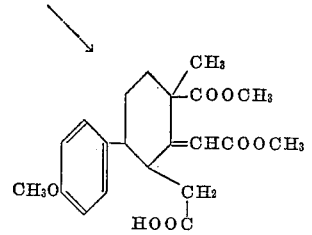
XV
(α) 112.5–113.0°
(β) 135.9–136.4°
XV
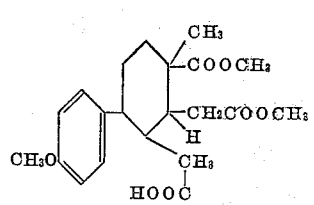
XVI
101.2–101.9°
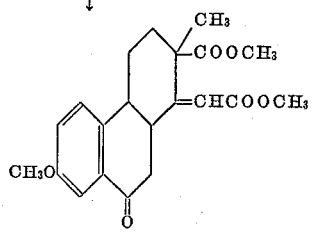
XVII
121.1–121.9°
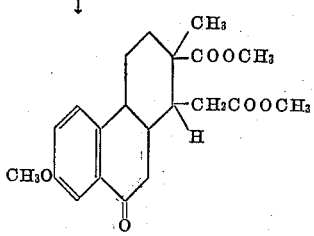
XXI
(α) 173.8–174.3°
(β) 126.0–126.4°
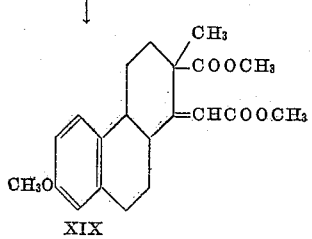
XVIII
147.8–148.4°
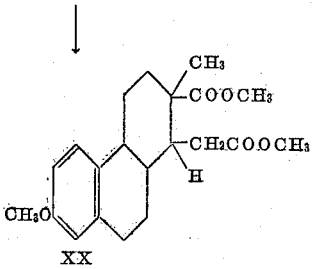
XXII
(α) 153.6–154.0°
145.4–145.8°
(β) 104.2–104.6°
XIX
112.0–112.2°
XVIII
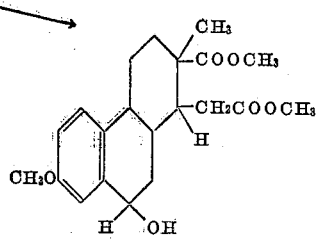
XX
(α) 89.5–90.0°
(β) 99.6–99.9°
XX
XXIII
111.9–114.8°
↓ ↓

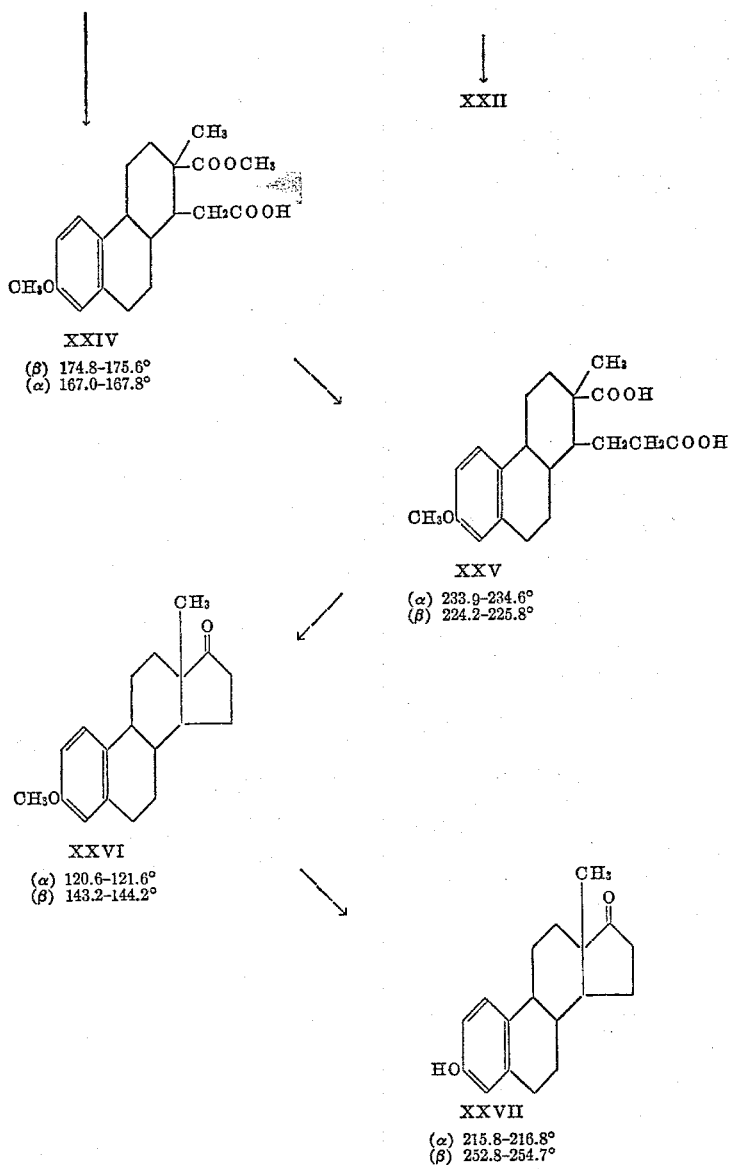

We claim:
1. The products selected from the group consisting of 6-p-(lower alkoxy)phenyl-3-carbolower alkoxy - 2 - hydroxy - 3 - methylcyclohexane-1,2-diacetic acid, and lower alkyl esters and lactones of the same.
2. The product, dimethyl 6-p-anisyl-3-carbomethoxy - 2 - hydroxy - 3 - methylcyclohexane-1,2-diacetate.
3. The product, 6-p-anisyl-3-carbomethoxy-2-carbomethoxymethyl - 2 - hydroxy - 3 - methylcyclohexane-1-acetic acid.
4. The lactone of the product of claim 3.
5. The products represented by the formula:

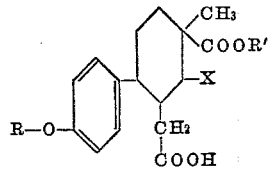

where X is selected from the group consisting of =CHCOOR'' and

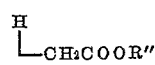

and where R, R' and R'' are lower alkyl groups.

6. The product, methyl 5-p-anisyl-2-carbomethoxy - 6 - carbomethyl - 2 - methylcyclohexylidene - 1 - acetate.
7. The product, methyl 5-p-anisyl-2-carbomethoxy - 6 - carboxymethyl - 2 - methylcyclohexane-1-acetate.
8. The products represented by the formula:

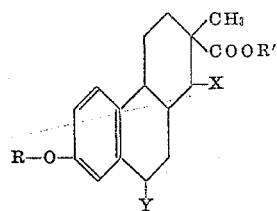

where X is selected from the group consisting of =CHCOOR'' and

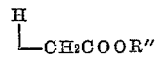

Y is selected from the group consisting of =O and

and where R, R', and R'' are lower alkyl groups.

9. The product, methyl 2-carbomethoxy-9-keto - 7 - methoxy - 2 - methyl - 1,2,3,4,4a,9,10,-10a-octahydrophenanthrylidene-1-acetate.

10. The product, dimethyl 9-ketomarrianolate methyl ether.

11. The product, dimethyl 9-hydroxymarrianolate methyl ether.

12. A process which comprises heating methyl 6 - p - anisyl - 3 - carbomethoxy - 2 - keto - 3-methyl-cyclohexane-1-acetae with zinc and methyl bromoacetate.

13. A process which comprises heating a mixture of the lactone of 6-p-anisyl-3-carbomethoxy - 2 - carbomethoxymethyl - 2 - hydroxy - 3-methylcyclohexane-1-acetic acid and dimethyl 6-p-anisyl - 3 - carbomethoxy - 2 - hydroxy - 3-methyl-cyclohexane-1,2-diacetate with formic acid and then alcoholic alkali.

14. A process which comprises reacting methyl 5 - p - anisyl - 2 - carbomethoxy - 6 - carboxymethyl - 2 - methylcyclohexylidene - 1 - acetate with thionyl chloride and reacting the resulting acid chloride with anhydrous aluminum chloride.

15. A process which comprises heating a lower alkyl 6-p-(lower alkoxy) phenyl-3-carbo-lower alkoxy - 2 - keto - 3 - methylcyclohexane - 1-acetate with zinc and a lower alkyl bromoacetate, hydrolyzing the reaction mixture, heating the resulting mixture of the lactone of a 6-p-(lower alkoxy) phenyl - 3 - carbo - lower alkoxy - 2-carbo - lower alkoxymethyl - 2 - hydroxy - 3-methylcyclohexane - 1 - acetic acid and a di-lower alkyl 6-p-(lower alkoxy)-phenyl-3-carbo-lower alkoxy - 2 - hydroxy - 3 - methylcyclohexane-1,2-diacetate with formic acid and then with alcoholic alkali, converting the resulting lower alkyl 5-p-(lower alkoxy)-phenyl-2-carbo-lower alkoxy - 6 - carboxymethyl - 2 - methylcyclohexylidene-1-acetate to its acid chloride with the chloride of a strong acid, treating the acid chloride with a Friedel-Crafts type catalyst, and hydrolyzing the resultant complex to produce a lower alkyl 2-carbo-lower alkoxy-9-keto-7-lower alkoxy-2-methyl-1,2,3,4,4a,9,10,10a-octahydrophenanthrylidene-1-acetate.

WILLIAM S. JOHNSON.
ROBERT GEORGE CHRISTIANSEN.

No references cited.